(12) United States Patent
Freda et al.

(10) Patent No.: US 12,231,941 B2
(45) Date of Patent: *Feb. 18, 2025

(54) OPERATING DUAL CONNECTIVITY IN AN INACTIVE STATE

(71) Applicant: InterDigital Patent Holdings, Inc., Wilmington, DE (US)

(72) Inventors: Martino M. Freda, Laval (CA); Yugeswar Deenoo, Chalfont, PA (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,784

(22) Filed: Sep. 29, 2023

(65) Prior Publication Data

US 2024/0022944 A1 Jan. 18, 2024

Related U.S. Application Data

(63) Continuation of application No. 16/763,842, filed as application No. PCT/US2018/061098 on Nov. 14, 2018, now Pat. No. 11,838,781.

(Continued)

(51) Int. Cl.
*H04W 24/10* (2009.01)
*H04W 76/27* (2018.01)

(52) U.S. Cl.
CPC .......... *H04W 24/10* (2013.01); *H04W 76/27* (2018.02)

(58) Field of Classification Search
CPC ..... H04W 24/10; H04W 76/27; H04W 76/15; H04W 76/19; H04W 68/00; H04W 74/0833; H04W 68/02
See application file for complete search history.

(56) References Cited

U.S. PATENT DOCUMENTS 8,135,419 B2 3/2012 Wang et al.
9,420,476 B2 8/2016 Koutsimanis et al.
(Continued)

FOREIGN PATENT DOCUMENTS

CN 101669384 A 3/2010
CN 102714788 A 10/2012
(Continued)

OTHER PUBLICATIONS

3rd Generation Partnership Project (3GPP), "Considerations on fast access inter-site small cells in NR", Nokia, Alcatel-Lucent Shanghai Bell, R2-167545, 3GPP TSG RAN WG2 #96, Reno, Nevada, USA, Nov. 14-18, 2016, 7 pages.

(Continued)

*Primary Examiner* — Chi H Pham
*Assistant Examiner* — Raul Ri
(74) *Attorney, Agent, or Firm* — Flaster Greenberg, P.C.

(57) ABSTRACT

A wireless transmit receive unit (WTRU) may operate in a dual connectivity (DC) context. While in a RRC_INACTIVE state, the WTRU may receive a paging message from a first cell, which may be associated with a master cell group (MCG). The paging message may indicate that the WTRU is to respond to the paging message on another cell. Also, or alternatively, the paging message may indicate that data for the WTRU is available on an SCG bearer. The WTRU may select a second cell (e.g., a cell other than the first cell) from a secondary cell group (SCG) list, which may include one or more secondary cells. The WTRU may initiate a random access channel procedure with the second cell based on receiving the paging message from the first cell. The WTRU may receive data from the second cell via the SCG bearer while in the RRC_INACTIVE state.

18 Claims, 6 Drawing Sheets

Related U.S. Application Data

(60) Provisional application No. 62/585,944, filed on Nov. 14, 2017, provisional application No. 62/629,382, filed on Feb. 12, 2018.

(56) References Cited

U.S. PATENT DOCUMENTS

| | | | |
|---|---|---|---|
| 9,661,564 | B2 | 5/2017 | Watfa et al. |
| 10,009,925 | B2 | 6/2018 | Vajapeyam et al. |
| 2011/0201343 | A1 | 8/2011 | Pinheiro et al. |
| 2012/0108199 | A1 | 5/2012 | Wang et al. |
| 2013/0005397 | A1* | 1/2013 | de Jong .............. H04W 36/14 455/552.1 |
| 2013/0260810 | A1 | 10/2013 | Rayavarapu |
| 2015/0024706 | A1 | 1/2015 | Wang et al. |
| 2015/0126205 | A1 | 5/2015 | Kim et al. |
| 2015/0296400 | A1 | 10/2015 | Yang et al. |
| 2015/0359034 | A1 | 12/2015 | Kim et al. |
| 2015/0365993 | A1 | 12/2015 | Aminaka et al. |
| 2016/0014706 | A1 | 1/2016 | Vajapeyam et al. |
| 2016/0080993 | A1 | 3/2016 | Pani et al. |
| 2016/0255619 | A1 | 9/2016 | Yi et al. |
| 2017/0208501 | A1 | 7/2017 | Lee et al. |
| 2017/0257903 | A1 | 9/2017 | Kim et al. |
| 2017/0339714 | A1 | 11/2017 | Harada et al. |
| 2018/0041939 | A1 | 2/2018 | Pelletier et al. |
| 2018/0288666 | A1 | 10/2018 | Fujishiro et al. |
| 2018/0332512 | A1 | 11/2018 | Dalsgaard et al. |
| 2018/0332659 | A1 | 11/2018 | Hwang et al. |
| 2019/0014553 | A1 | 1/2019 | Feng et al. |
| 2022/0150741 | A1 | 5/2022 | Teyeb et al. |

FOREIGN PATENT DOCUMENTS

| | | | |
|---|---|---|---|
| EP | 3065443 | A1 | 9/2016 |
| KR | 2013/0125728 | A | 11/2013 |
| KR | 20150113168 | A | 10/2015 |
| KR | 101587676 | B1 | 1/2016 |
| KR | 2016/0074477 | A | 6/2016 |
| KR | 2017/0022933 | A | 3/2017 |
| KR | 2017/0032290 | A | 3/2017 |
| KR | 2017/0066380 | A | 6/2017 |
| KR | 101768352 | B1 | 8/2017 |
| KR | 101797094 | B1 | 12/2017 |
| KR | 101902559 | B1 | 10/2018 |
| WO | WO 2014/112000 | A1 | 7/2014 |
| WO | WO 2016/022935 | A1 | 2/2016 |
| WO | WO 2016/072221 | A1 | 5/2016 |

OTHER PUBLICATIONS

3rd Generation Partnership Project (3GPP), "Inactive and dual connectivity", Intel Corporation, R2-1708808, 3GPP TSG RAN WG2 #99, Berlin, Germany, Aug. 12, 2017, 3 pages.

3rd Generation Partnership Project (3GPP), "Inter-RAT mobility from RRC_Inactive", LG Electronics Inc., R2-1704547, 3GPP TSG RAN WG2 #98, Hangzhou, China, May 15-19, 2017, 2 pages.

3rd Generation Partnership Project (3GPP), "Open Issues for MN/SN Procedures", Qualcomm Incorporated, R2-1709639, 3GPP TSG-RAN2 Meeting #99, Berlin, Germany, Aug. 21-25, 2017, 3 pages.

3rd Generation Partnership Project (3GPP), "RRC Connection Suspend and Resume", Ericsson, R2-160475, 3GPP TSG-RAN WG2 NB-IOT Ad-Hoc Meeting, Budapest, Hungary, Jan. 19-21, 2016, pp. 1-14.

3rd Generation Partnership Project (3GPP), "RRC_Inactive with MR_DC", Qualcomm Incorporated, R3-172739, 3GPP TSG-RAN WG3 Meeting #97, Berlin, Germany, Aug. 21-25, 2017, 6 pages.

3rd Generation Partnership Project (3GPP), "RRM measurements on SS block", ZTE, R1-1712068, 3GPP TSG RAN WG1 #90, Prague, Czechia, Aug. 21-25, 2017, 9 pages.

3rd Generation Partnership Project (3GPP), "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", TS 36.300 V13.3.0, Mar. 2016, pp. 1-295.

3rd Generation Partnership Project (3GPP), "Technical Specification Group Radio Access Network, Evolved Universal Terrestrial Radio Access (E-UTRA), Medium Access Control (MAC) Protocol Specification (Release 13)", TS 36.321 V13.1.0, Mar. 2016, pp. 1-85.

3rd Generation Partnership Project (3GPP), "Technical Specification Group Radio Access Network, Evolved Universal Terrestrial Radio Access (E-UTRA), Physical Layer Procedures (Release 13)" TS 36.213 V13.2.0, Jun. 2016, pp. 1-381.

3rd Generation Partnership Project (3GPP), "Technical Specification Group Radio Access Network, Evolved Universal Terrestrial Radio Access (E-UTRA), Radio Resource Control (RRC), Protocol Specification (Release 13)", TS 36.331 V13.1.0, Mar. 2016, pp. 1-551.

3rd Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2" (Release 12), 3GPP TS 37.320 V12. 2.0, Sep. 2014, 25 pages.

3rd Generation Partnership Project, "On NR-PDCCH Structure", InterDigital Communications, R1-1705516, 3GPP TSG RAN WG1 #88bis Meeting, Spokane, WA, USA, Apr. 3-8, 2017, 6 pages.

3rd Generation Partnership Project, "Solution for Group based messaging using cell broadcast", HTC, S2-142826, SA WG2 Meeting #104, Dublin, Ireland—Jul. 7-11, 2014, 6 pages.

Third Generation Partnership Project (3GPP), "Consideration of UE States", CMCC, R2-163449, May 23-27, 2016, 4 pages.

Third Generation Partnership Project (3GPP), "Cell Selection and Re-Selection Criteria and Measurement Configuration", Ericsson, TDOC R2-1709298, Aug. 21-25, 2017, 4 pages.

* cited by examiner

OPERATING DUAL CONNECTIVITY IN AN INACTIVE STATE

CROSS-REFERENCE TO RELATED APPLICATIONS

This application is a continuation of U.S. patent application Ser. No. 16/763,842, filed May 13, 2020, which is the National Stage entry under 35 U.S.C. § 371 of Patent Cooperation Treaty Application No. PCT/US2018/061098, filed Nov. 14, 2018, which claims priority from U.S. Provisional Patent Application No. 62/629,382, filed Feb. 12, 2018, and U.S. Provisional Patent Application No. 62/585,944, filed Nov. 14, 2017, which are each incorporated by reference herein in their entireties.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

A wireless transmit receive unit (WTRU) may operate in a dual connectivity (DC) mode. While in the dual connectivity mode, the WTRU may communicate with a master cell group (MCG) and a secondary cell group (SCG). The WTRU may operate in one or more states, such as: a radio resource control (RRC) Inactive (RRC_INACTIVE) state, and/or a RRC Connected (RRC_CONNECTED state.

While in a RRC_INACTIVE state, the WTRU may receive a paging message from a first cell, which may be associated with a master cell group (MCG). The paging message may indicate that the WTRU is to respond to the paging message on another cell. The paging message may indicate that data for the WTRU is available on an SCG bearer. The WTRU may select a second cell (e.g., a cell other than the first cell) from a secondary cell group (SCG) list, which may include one or more secondary cells. The one or more secondary cells may be associated with the same lower layer configuration (e.g., the secondary cells of the SCG may share a common physical layer configuration). The second cell may be selected based on measurement results, for example the strongest or best cell on the SCG list may be selected. The WTRU may initiate a random access channel (RACH) procedure with the second cell based on receiving the paging message from the first cell. The WTRU may receive data from the second cell via the SCG bearer while in the RRC_INACTIVE state.

The WTRU may perform mobility related procedures while in the RRC_INACTIVE state. The WTRU may determine (e.g., periodically) a quality metric for the one or more secondary cell on the SCG list while in the RRC_INACTIVE state. The WTRU may compare the quality metric for each of the one or more cells to a threshold. The WTRU may transition to a RRC_CONNECTED state when the quality metric for each of the one or more cells is above the threshold. The WTRU may receive an updated SCG list after transitioning to the RRC_CONNECTED state.

Systems, methods, and instrumentalities are disclosed for WTRUs operating the RRC_INACTIVE state. System information (SI) may be provided for a DC configuration applicable to the RRC_INACTIVE state. A WTRU may transition to the RRC_CONNECTED state or perform an area update procedure, for example, based on secondary node (SN)-mobility related triggers, e.g., for a list of potential primary secondary cells (PSCells) while the WTRU is in the RRC_INATCIVE state. Procedures may support measurement events related to a list of potential PSCells. A WTRU may report SN-related measurement information and an indication for context update/deletion, for example, during a state transition or area update. A WTRU may receive paging, which may initiate downlink (DL) data transmission from an SN. A WTRU may transmit control/data (e.g., an associated triggering conditions) to an SN while in the RRC_INACTIVE state.

A WTRU may request and/or receive SI associated with a set of secondary cells (SCells) in a configured SCell list. A WTRU may request and/or receive validity information from the PCells, which may be associated with SCell SI broadcasted by the SCell. A WTRU may receive access parameters (e.g., uplink (UL) grant, timing offset, RACH parameters, and/or the like) applicable for the Scell, e.g., in a paging message from the PCell. A WTRU may be configured (e.g., pre-configured) with a set of dedicated configurations. A WTRU may determine the applicable configuration for an SCell based on signaling in the system information block (SIB). A WTRU may use a configuration (e.g., a default dedicated configuration) for access to an Scell (e.g., certain access to all SCells). A WTRU may request a non-default dedicated configuration from (e.g., directly from) the SCell.

BRIEF DESCRIPTION OF THE DRAWINGS

Like reference numerals in the figures indicate like elements.

DETAILED DESCRIPTION

Figure 1A:
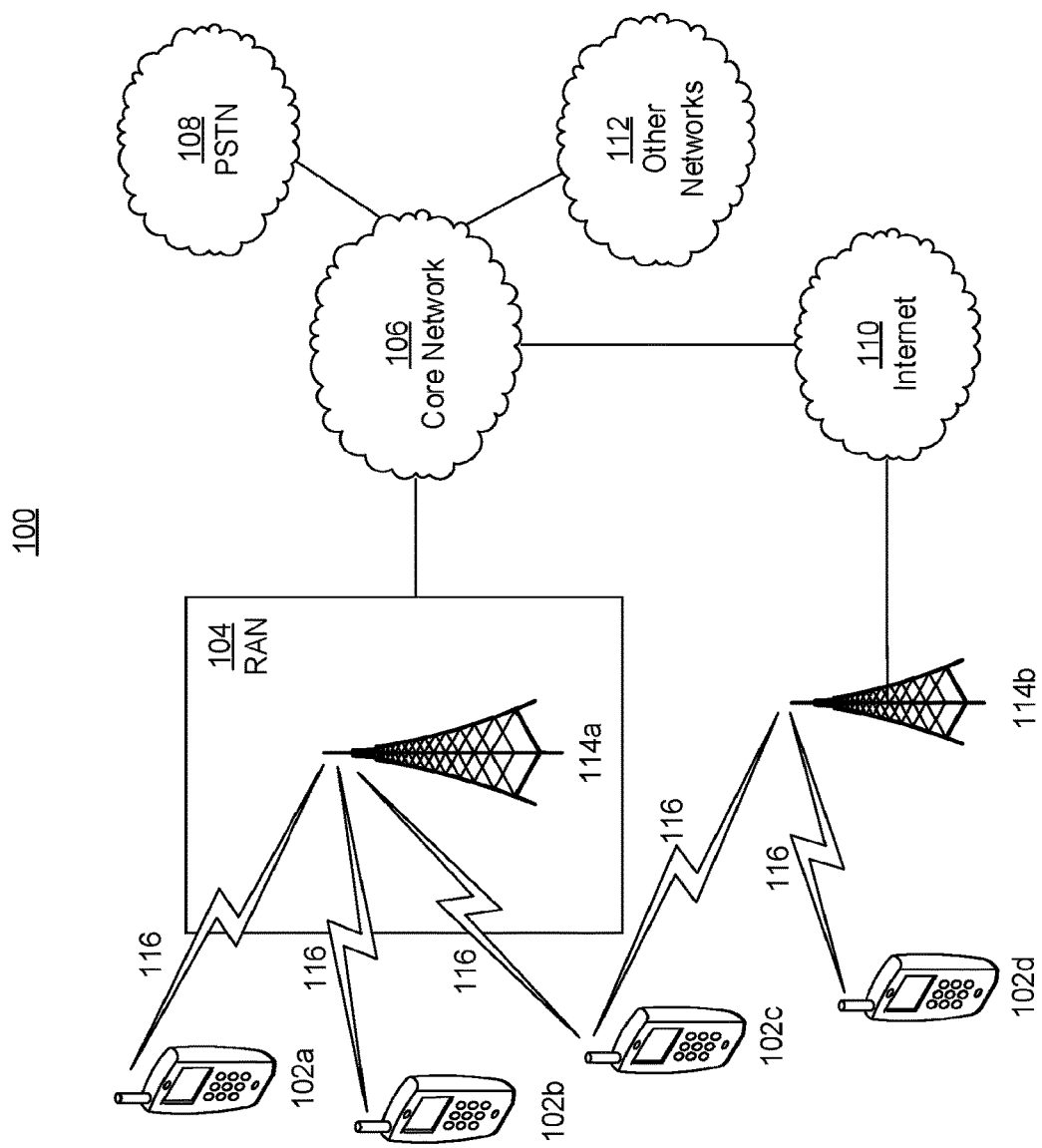
FIG. 1A is a system diagram illustrating an example communications system in which one or more disclosed embodiments may be implemented.

A detailed description of illustrative embodiments will now be described with reference to the various Figures. Although this description provides a detailed example of possible implementations, it should be noted that the details are intended to be exemplary and in no way limit the scope of the application.

Table 1 is a list of acronyms that me be used herein.

TABLE 1

| | |
|---|---|
| Δf | Sub-carrier spacing |
| 5gFlex | 5G Flexible Radio Access Technology |
| 5gNB | 5GFlex NodeB |
| ACK | Acknowledgement |
| BLER | Block Error Rate |
| BRS | Beam Reference Signal |
| BTI | Basic TI (in integer multiple of one or more symbol duration) |
| CB | Contention-Based (e.g. access, channel, resource) |
| CBRA | Contention Based Random Access |
| CFRA | Contention Free Random Access |
| CoMP | Coordinated Multi-Point transmission/reception |
| CP | Cyclic Prefix |
| CP-OFDM | Conventional OFDM (relying on cyclic prefix) |
| CQI | Channel Quality Indicator |
| CN | Core Network (e.g. LTE packet core) |
| CRC | Cyclic Redundancy Check |
| CSG | Closed Subscriber Group |
| CSI | Channel State Information |
| CU | Central Unit |
| D2D | Device to Device transmissions (e.g. LTE Sidelink) |
| DCI | Downlink Control Information |
| DL | Downlink |
| DM-RS | Demodulation Reference Signal |
| DRB | Data Radio Bearer |
| DU | Distributed Unit |
| EPC | Evolved Packet Core |
| FBMC | Filtered Band Multi-Carrier |
| FBMC/OQAM | A FBMC technique using Offset Quadrature Amplitude Modulation |
| FDD | Frequency Division Duplexing |
| FDM | Frequency Division Multiplexing |
| ICC | Industrial Control and Communications |
| ICIC | Inter-Cell Interference Cancellation |
| IP | Internet Protocol |
| LAA | License Assisted Access |
| LBT | Listen-Before-Talk |
| LCH | Logical Channel |
| LCP | Logical Channel Prioritization |
| LLC | Low Latency Communications |
| LTE | Long Term Evolution e.g. from 3GPP LTE R8 and up |
| MAC | Medium Access Control |
| NACK | Negative ACK |
| MC | MultiCarrier |
| MCS | Modulation and Coding Scheme |
| MIMO | Multiple Input Multiple Output |
| MTC | Machine-Type Communications |
| NAS | Non-Access Stratum |
| NR | New Radio |
| OFDM | Orthogonal Frequency-Division Multiplexing |
| OOB | Out-Of-Band (emissions) |
| $P_{cmax}$ | Total available UE power in a given TI |
| PHY | Physical Layer |
| PRACH | Physical Random Access Channel |
| PDU | Protocol Data Unit |
| PER | Packet Error Rate |
| PLMN | Public Land Mobile Network |
| PLR | Packet Loss Rate |
| PSS | Primary Synchronization Signal |
| QoS | Quality of Service (from the physical layer perspective) |
| RAB | Radio Access Bearer |
| RAN PA | Radio Access Network Paging Area |
| RACH | Random Access Channel (or procedure) |
| RAR | Random Access Response |
| RCU | Radio access network Central Unit |
| RF | Radio Front end |
| RLF | Radio Link Failure |
| RLM | Radio Link Monitoring |
| RNTI | Radio Network Identifier |
| RRC | Radio Resource Control |
| RRM | Radio Resource Management |
| RS | Reference Signal |
| RTT | Round-Trip Time |
| RUL | Regular Uplink |
| SCMA | Single Carrier Multiple Access |
| SDU | Service Data Unit |
| SOM | Spectrum Operation Mode |
| SS | Synchronization Signal |
| SSS | Secondary Synchronization Signal |
| SRB | Signaling Radio Bearer |
| SUL | Supplementary Uplink |
| SWG | Switching Gap (in a self-contained subframe) |
| TB | Transport Block |
| TBS | Transport Block Size |
| TDD | Time-Division Duplexing |
| TDM | Time-Division Multiplexing |
| TI | Time Interval (in integer multiple of one or more BTI) |
| TTI | Transmission Time Interval (in integer multiple of one or more TI) |
| TRP | Transmission/Reception Point |
| TRPG | Transmission/Reception Point Group |
| TRx | Transceiver |
| UFMC | Universal Filtered Multicarrier |
| UF-OFDM | Universal Filtered OFDM |
| UL | Uplink |
| URC | Ultra-Reliable Communications |
| URLLC | Ultra-Reliable and Low Latency Communications |
| V2V | Vehicle to vehicle communications |
| V2X | Vehicular communications |
| WLAN | Wireless Local Area Networks and related technologies (IEEE 802.xx domain) |

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
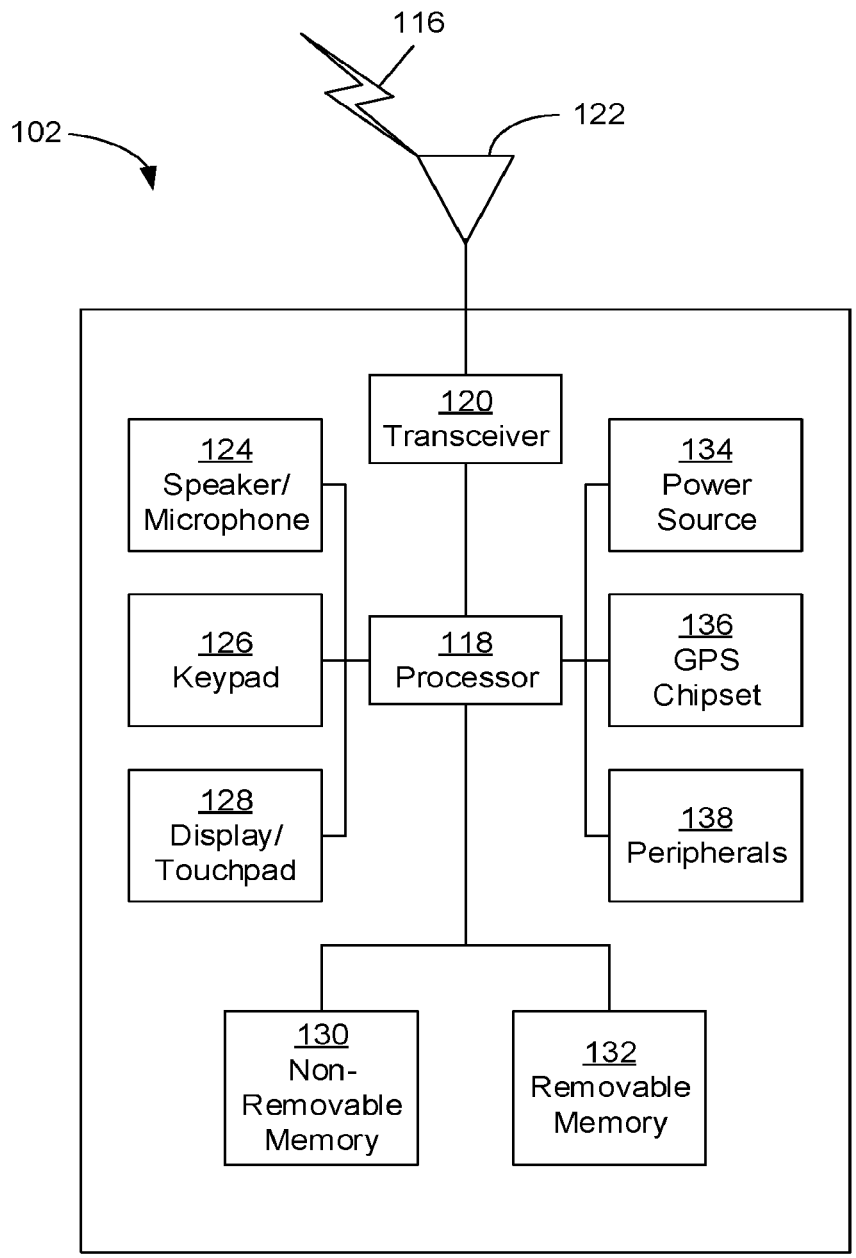
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
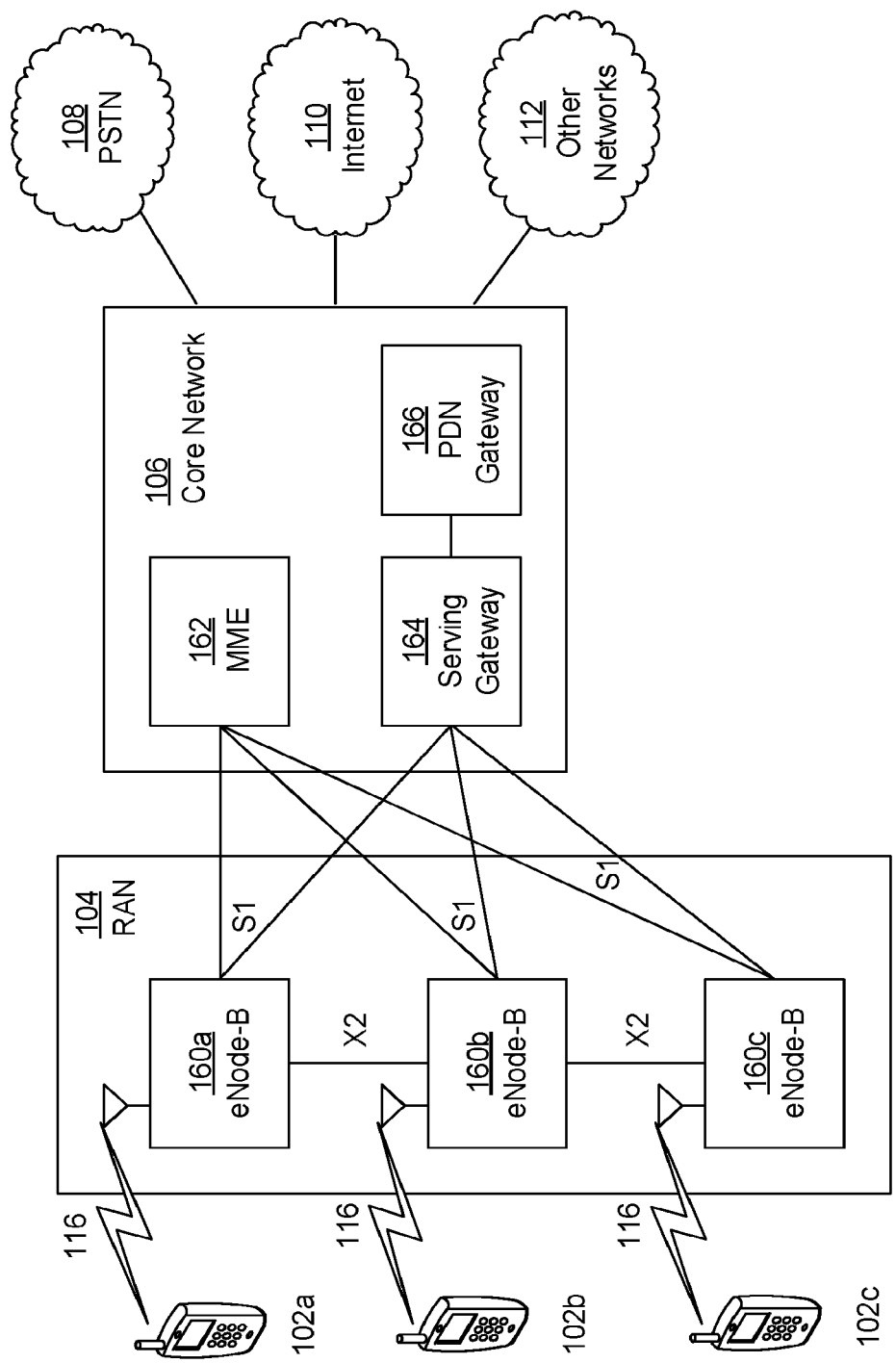
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement M IMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
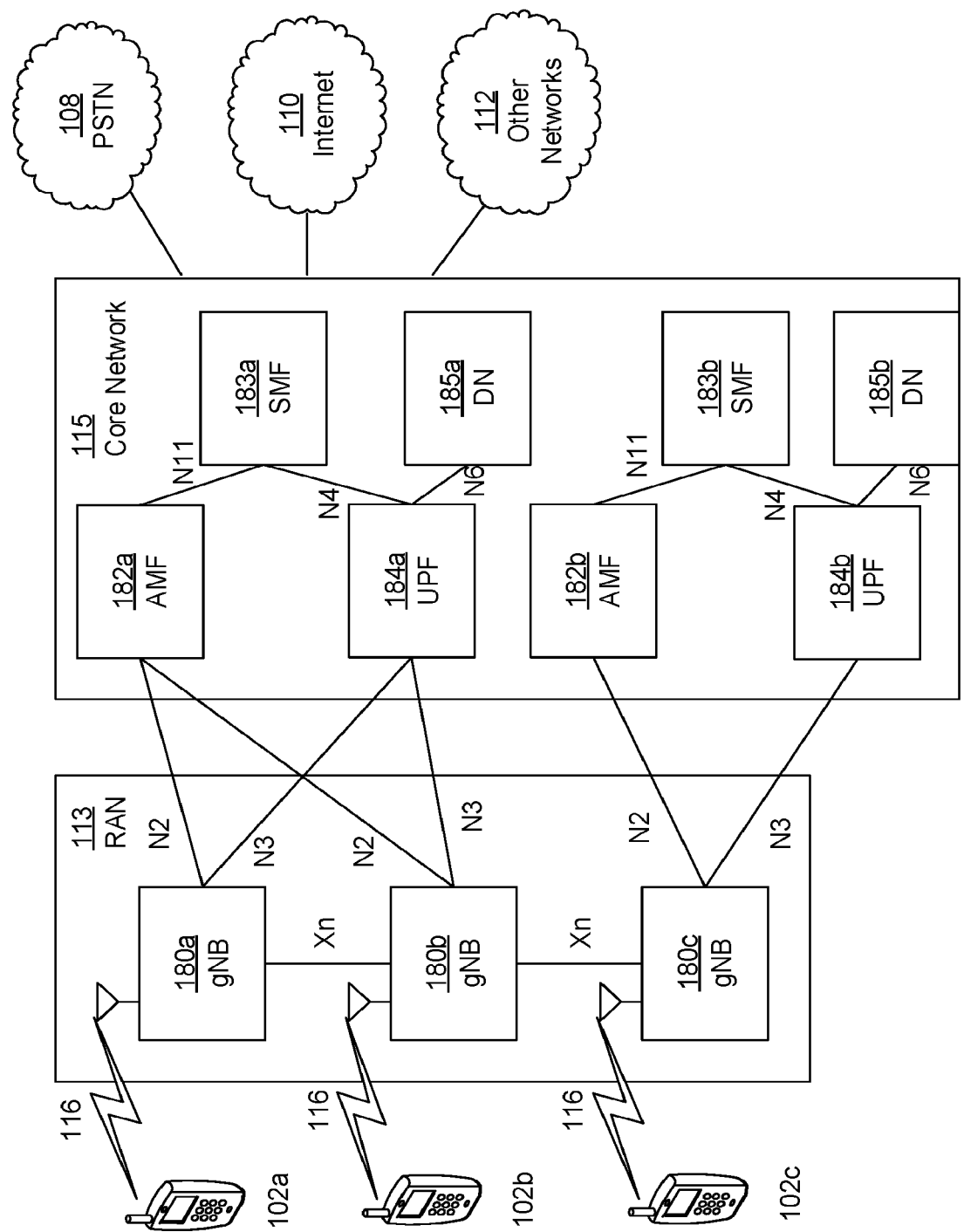
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

Network may refer to one or more gNBs that may be associated with one or more Transmission/Reception Points (TRPs) or other nodes in a radio access network (RAN).

A RRC state (e.g., RRC_INACTIVE) may be present in NR and/or other radio access technology types. A RRC_INACTIVE state may be characterized, for example, by the one or more of the following: cell re-selection mobility; a CN-NR RAN connection (e.g., both C/U-planes) established for a WTRU; a WTRU's access stratum (AS) context may be stored in at least one gNB and the WTRU; paging may be initiated by an NR RAN; a RAN-based notification area may be managed by an NR RAN; and/or an NR RAN may be aware of a RAN-based notification area that a WTRU belongs to.

Signaling of a transition between a RRC_INACTIVE state and a RRC_CONNECTED state may, for example, include the WTRU sending and/or receiving RRC messages that indicate that an RRC connection should be resumed. Suspend-resume signaling for cellular internet of things (CIoT) (e.g., in LTE), where a context may be maintained during a suspend procedure may utilize similar resume signaling.

Dual Connectivity (DC) operation may be supported by a WTRU (e.g., in LTE and/or in NR).

A DC WTRU in a RRC_CONNECTED state may be configured (e.g., in LTE) to utilize the radio resources provided by multiple (e.g., two) distinct schedulers, which may be distinctly located in multiple (e.g., two) eNBs/gNBs that are connected (e.g., via a backhaul over the X2 interface). eNBs involved in DC for a WTRU may assume multiple (e.g., two) different roles. An eNB may, for example, act as a master eNB (MeNB)/master gNB (MgNB) or as a secondary eNB (SeNB)/secondary gNB (SgNB). A WTRU (e.g., in DC) may be connected to the MeNB and/or the SeNB. A WTRU configured with DC may or may not (e.g., in relation to a suspend/resume procedure) release a secondary cell group (SCG) configuration, for example, when resuming a RRC connection (e.g., when a WTRU transitions to a RRC_CONNECTED state).

DC between multiple gNBs may be supported (e.g., in NR). Multi-RAT DC (MR-DC) between a master node (MN) and a secondary node (SN) may be supported (e.g., in NR). MR-DC may take one or more of the following forms: E-UTRA-NR Dual Connectivity (EN-DC), where an MN may be LTE, an SN may be NR and a core network (CN) may be LTE; NG-RAN E-UTRA-NR Dual Connectivity (NGEN-DC), where the LTE CN is replaced with an NR CN; and NR-E-UTRA Dual Connectivity (NE-DC), where an MN may be NR, an SN may be LTE and a CN may be NR.

A WTRU may transition (e.g., transition often) between a RRC_INACTIVE state and a RRC_CONNECTED state (e.g., in NR). If reconfiguration of a DC configuration is performed after each state transition (e.g. each state transition), a WTRU configured with DC may incur a relatively large amount of signaling overhead to in addition to network (NW) signaling to tear down and/or re-establish a CN-RAN connection to an SN. Techniques described herein may allow for a WTRU to transition from the RRC_INACTIVE state to and from the RRC_CONNECTED state with reduced signaling overhead.

A WTRU and/or NW may evaluate the validity of a DC configuration (e.g., a current DC configuration) considering the WTRU's mobility. The WTRU may perform maintenance of valid configurations.

Maintaining a CN-RAN interface with an SN may be implemented, for example, by transferring data on an SCG bearer to a WTRU or NW with minimal signaling/latency for reconfiguration. A NW may (e.g., additionally) be informed, for example, when a CN-RAN interface is switched (e.g., due to WTRU mobility).

A WTRU may be configured to perform DC while in an inactive state (e.g., the RRC_INACTIVE state). A WTRU may perform mobility, for example, while in an inactive state.

A WTRU may maintain an accurate/applicable DC configuration of one or more cells while in the RRC_INACTIVE state. A WTRU may, for example, perform measurements (e.g., RRM) of connected SN cells and/or neighbor cells (e.g., when a change of cell or SN node may be required). A WTRU may, for example, acquire (e.g., be enabled to acquire) the configuration of a PSCell while in the RRC_INACTIVE state.

A WTRU may receive a SI message while in the RRC_INACTIVE state. The WTRU may use the SI message to perform DC while in the RRC_INACTIVE state.

As described herein, a WTRU may receive one or more SI message, which may be used to perform DC wile in the RRC_INACTIVE state. The quantity and/or size of the SI message received by the WTRU may be reduced. SI for a WTRU may be used for operation/maintenance of DC while the WTRU is in the RRC_INACTIVE state (e.g., DC_Inactive_SI). SI may be transmitted in one or more system information blocks (SIBs)/SI messages, which may be dedicated for that purpose. An SIB or SI message may be broadcasted (e.g., periodically broadcasted) by a cell, which may (e.g., for a given WTRU) be configured as a primary secondary cell (PSCell). In an example, a network may cease (e.g., turn off) broadcasting on a SIB/SI, for example, when there are not any WTRUs currently configured in DC with a given PSCell or surrounding PSCells. An SI message may (e.g., may alternatively) be transmitted by a primary cell (PCell), e.g., as part of PCell's own system information. The contents of an SI message may include, for example, one or more of the following: parameters that are associated with selection/reselection of SN (e.g., thresholds); parameters used to perform measurements of a PSCell (e.g., cell bandwidth, configuration of RSs, measurement configuration, event configuration specific to INACTIVE state, etc.); parameters associated with transmission of data and/or RRC signaling (e.g., directly) to an SN while in the RRC_INACTIVE state (e.g., conditions on WTRU, thresholds, etc.); L1/L2 configuration for PSCells; and/or potential PSCells that may be associated with a PCell, or with a PSCell that may be configured at the time of transition to the RRC_INACTIVE state.

A WTRU may receive certain SI, which may be used by the WTRU to perform measurements and/or cell reselection determinations. For example, a WTRU may receive a DC_Inactive_SI, which may be used by the WTRU to perform measurements and PSCell reselection determinations. The DC_Inactive_SI may include information that allows a WTRU to access a PSCell while the WTRU is in the RRC_INACTIVE state. For example, the DC_Inactive_SI may include random-access channel (RACH) parameters.

A WTRU may receive SI (e.g., DC_Inactive_SI) an MN that is associated with an SN.

A WTRU may request, receive and/or read SI (e.g., DC_Inactive_SI) from an MN. A WTRU may request SI, for example, by using an on-demand request procedure. If a WTRU requests SI using an on-demand request procedure the broadcasting (e.g., at all times) of such information by a cell may be avoided. A WTRU may obtain validity information and/or scheduling information for receiving SI from a MN's minimum SI (e.g., as with any other SI). A WTRU may request SI that is specific to a PSCell and/or a PCell, for example, by including a PSCell/PCell cell ID in an on-demand request. The WTRU may include the PSCell ID in a MSG3 of the SI request, for example, in order to receive system information for the SN PSCell. The WTRU may select a PRACH time/frequency resource and/or preamble associated with the PSCell (e.g., based on the configuration). The WTRU may transmit a PSCell ID in a multi-step (e.g., two-step) RACH. For example, the WTRU may request SI specific to the PSCell via the multi-step RACH. may. A WTRU may obtain separate DC_Inactive_SI for one or more (e.g., all) potential PSCells for a given PCell, for example, using a single request. The WTRU may obtain SI for a set of SCells associated with the SN (e.g., according to a preconfigured SCell list). For example, the WTRU may be configured with the Scell list when the WTRU transitions from a RRC CONNECTED state to a RRC_INACTIVE state. The WTRU may include (e.g., in the SI request) information indicative of the SCell list that the WTRU is requesting the configuration information from.

A WTRU may receive and/or read a DC_Inactive_SI (e.g., directly) from a SI broadcast of an SN. A WTRU may determine, assume, or be configured to know that information may be broadcast, for example, in a SIB or SI message that may be provided on a cell that may serve as a PSCell (e.g., in a non-standalone (NSA) NR Cell). A WTRU may obtain validity information (e.g., a value tag) and/or scheduling information that is associated with cell reselection SI from a master PCell. A WTRU may determine whether and when to acquire new SI (e.g., associated with SN reselection parameters), for example, based on the acquisition of validity and/or scheduling information in a minimum SI (e.g., that may be broadcast by a PCell). A WTRU may receive validity information and/or scheduling information (e.g., directly) from a SN. A WTRU may read a minimum SI that may be broadcast periodically (e.g., at every wakeup of WTRU's INACTIVE state DRX cycle) by a PSCell, for example, to determine whether to acquire new DC_Inactive_SI.

The WTRU may receive the validity information for the SI of the SCells from the PCell through an SI request procedure and may receive the actual SI associated with SCell from (e.g., directly from) a broadcast of the SCell. The PCell and SCell may not broadcast the scheduling and/or validity information of the SCell's SI, and the SCell may not broadcast the SI (e.g., the actual SI). The WTRU may trigger the SCell to initiate a broadcast of the SCell's related SI (e.g., by sending an SI request to the MN). The WTRU may (e.g., at the same time) receive scheduling and validity information from (e.g., directly from) the PCell.

A WTRU may obtain SI for a PSCell (e.g., the SN cell) from previously obtained SI. The WTRU may store previously obtained SI for a cell (e.g., a SN cell and/or a PSCell). The WTRU may have previously obtained the SI while the WTRU was camped/connected to the cell (e.g., connected to the cell as a PCell). The WTRU may have previously obtained the SI with or without dual connectivity configured. The WTRU may use the previously obtained SI when for the cell (e.g., when the WTUR uses the cell as a SN cell and/or a PSCell).

A WTRU may receive an indication of an SN configuration in a paging message.

A WTRU may receive a notification, which may indicate to the WTRU to use a new SN configuration (e.g., applicable to one or more SN cells (PSCells/SCells)). For example, the WTRU may receive the notification in a paging message. The WTRU may receive the paging message from a MN. The WTRU may receive (e.g., in a paging message), an indication that an SI change is applicable to a DC_Inactive_SI.

A WTRU may be configured with a list of potential PSCells/SN SCells.

A WTRU may be configured (e.g., implicitly or explicitly) with a list of SCG cells in which the WTRU may, for example, perform mobility while in a RRC_INACTIVE state, direct data/control transmission (e.g., without transitioning to a RRC_CONNECTED state) while in a RRC_INACTIVE state, and/or for which the WTRU may perform one or more measurements that may initiate a transition to a RRC_CONNECTED state, e.g., to update a WTRU's DC context in a network. Such list(s) may be configured at the WTRU while the WTRU is in a RRC_CONNECTED state or configured at the WTRU during the transition from a RRC_CONNECTED state to a RRC_INACTIVE state.

A WTRU may be configured with one or more triggers for the WTRU to transition to and/or from a RRC_CONNECTED state and/or one or more triggers for the WTRU to perform an area update. For example, the triggers may be based on the WTRU's mobility and/or the WTRU's state with respect to a SN.

A WTRU may transition to a RRC_CONNECTED state or perform an area update based on one or more triggers (e.g., mobility events, measurements that may be related to a PSCell or SCell, or traffic characteristics that may be related to a PSCell or SCell). A transition to the RRC_CONNECTED state may be performed (e.g., by a WTRU), for example, to inform a network of one or more of the following: a need to update the PSCell of a DC configuration; a need to clear/update a context in one or more network nodes; and/or a WTRU's movement outside of a specific area of SN coverage. As described herein, a WTRU may transition to the RRC_CONNECTED state based on a trigger (e.g., quality measurements that may be related to a PSCell or SCell, or traffic characteristics that may be related to a PSCell or Scell). The trigger may include comparing a quality measurement or traffic characteristic to a threshold.

A transition to a RRC_CONNECTED state may, for example, follow a procedure that may be a resume procedure (e.g., a resume procedure for NR). An area update procedure may, for example, follow a procedure that may be similar to a RAN area update procedure for NR.

A WTRU may be configured with a trigger for the WTRU to transition to a RRC_CONNECTED state. The configuration of triggers to transition to a RRC_CONNECTED state may be provided, for example, via RRC signaling (e.g., dedicated RRC signaling while in a RRC_CONNECTED state). The RRCH signaling may be received from an MN or from (e.g., directly from) an SN (e.g., via signaling radio bearer 3 (SRB3)). A WTRU may (e.g., also) receive a trigger configuration in a message, which may suspend a WTRU to a RRC_INACTIVE state. A WTRU may (e.g., when a configuration is required to be sent by an SN) receive a configuration in an encapsulated RRC message that may be generated by an SN (e.g., in the case of MR-DC).

A WTRU may be configured with a trigger for the WTRU to transition to the RRC_CONNECTED state based on the cell quality of a list of cells.

A WTRU may be configured with a list of cells (e.g., cell IDs) that may correspond to a range of potential PSCell candidates while the WTRU is in a RRC_INACTIVE state. A set of PSCell candidates may, for example, correspond to cells that are associated with a single SN, a single security key for the SN. A set of PSCell candidates may, for example, correspond to a list of cells in which a CN-RAN connection may be maintained during mobility.

A WTRU may be configured with a measurement event that may be associated with a list of cells. A measurement event (e.g., when triggered) may initiate a transition to a RRC_CONNECTED state and may be defined, for example, based on a fact that one or more cells may no longer be suitable for communication. One or more of the following may apply: a measured quality of all or a subset of SCG cells may fall below a threshold, e.g., for a period of time; a measured quality of a PSCell and a given number of other cells in a list may fall below a threshold, e.g., for a period of time; and/or a measured quality of one or more cells that are not part of a list of cells (e.g., a list of PSCells) may become a threshold better than a subset of cells in the list of cells, e.g., for a period of time.

A WTRU may be configured with a trigger for the WTRU to transition to the RRC_CONNECTED state based on cell quality within an area.

A measurement event (e.g., as described herein) may be defined, for example, by the absence of at least one cell broadcasting a signature, a set of related signatures, and/or an identifier that may be specific to an area or list of cells (e.g., an area ID). A WTRU may determine that a signature (s) or an area ID is similar to (e.g., the same as) a signature/area ID that is associated with a PSCell (e.g., when the WTRU was in a RRC_INNACTIVE state). A transition to a RRC_CONNECTED state or an area update procedure may be initiated, for example, based an inability to maintain a certain measurement quality for at least one cell. For example, a transition to a RRC_CONNECTED state or an area update procedure may be initiated based on a measurement quality metric falling below a threshold.

A WTRU may be configured with a trigger for the WTRU to transition to a RRC_CONNECTED state based on inactivity.

A WTRU may be configured, for example, with an inactivity timer or a SCG-ReleaseTimer (e.g., a RRC configured SCG-ReleaseTimer). The inactivity timer may be associated with data transmissions to an SN (e.g., by the WTRU). A WTRU may transition to the RRC_CONNECTED state, for example, upon expiration of the inactivity timer. The inactivity timer may be started, for example, when a WTRU transitions to the RRC_INACTIVE state. The inactivity timer may be reset. for example, when one or more of the following occurs: a WTRU transmits and/or receives data on a DRB and/or SRB that is associated with (e.g., only associated with) an SN (e.g., an SCG DRB), the WTRU transitions to the RRC_CONNECTED state, and/or the WTRU transitions to the RRC_INNACTIVE state (e.g., subsequently transitions back to a RRC_INACTIVE state). The resetting of an inactivity timer for a split DRB (e.g., a DRB where data may be transmitted to an MN or SN) may depend on the UL path selected for transmission of the data. The rules for determining the UL path for a split DRB while a WTRU is in the RRC_INNACTIVE state may be similar to (e.g., the same as) the rules for determining the UL path while the WTRU is in the RRC_CONNECTED state. Also, or alternatively, the rules for UL path determination (e.g., and/or the rules for resetting the inactivity timer) for a split DRB while a WTRU is in the RRC_INNACTIVE state may not be similar (e.g., different) to the rules for UL path determination while the WTRU is in the RRC_CONNECTED state when, for example, the WTRU is configured to transmit data to an MN on certain split bearers while in the RRC_INACTIVE state.

A WTRU may be configured with a trigger to indicate that the WTRU is to transition to the RRC_CONNECTED state based on MN mobility.

A WTRU may be configured with a trigger to indicate that the WTRU is to transition to the RRC_CONNECTED state, for example, based on MN mobility. A transition may be applicable, for example, (e.g., only) when a WTRU is configured with dual connectivity while in a RRC_INACTIVE state. A WTRU configured with DC while in the RRC_INACTIVE state may transition to a RRC_CONNECTED state, for example, when the WTRU performs cell reselection on a cell that is not a PCell (e.g., the current PCell when the WTRU transitions to the RRC_INACTIVE state). Also, or alternatively, a WTRU may be configured with an area (e.g., an area different than a RAN area), which may define a list of PCells (e.g., potential PCells). Reselection of a cell outside of the area may trigger a transition to the RRC_CONNECTED state. A trigger based on MN mobility may be disabled for a WTRU in the RRC_INACTIVE state, for example, when a DC Configuration is not maintained/active.

A WTRU may be configured with a trigger to indicate that the WTRU is to transition to the RRC_CONNECTED state based on a change in configuration (e.g., a change in configuration that no longer allows direct access).

A WTRU may be configured with a trigger to indicate that the WTRU is to transition to the RRC_CONNECTED state when, for example, the SI that is associated with one or more potential PSCells or cells on a SCG changes. When the SI that is associated with one or more potential PSCells or cells on a SCG changes, the WTRU may not access (e.g., may not be able to access) a cell for data transmission without transitioning to the RRC_CONNECTED state. In an example, a WTRU may receive parts of the SI (e.g., the full SI) that may be applicable for an SCG. A WTRU may re-acquire the full SI (e.g., SCG Configuration) while the WTRU is in the RRC_CONNECTED state, for example, to account for a change in an indication (e.g., a specific indication) of the SI. A change in an SI configuration may (e.g., may alternatively) indicate a change in security parameters or data transmission parameters that may (e.g., only) be obtained while in the RRC_CONNECTED state.

A WTRU may be configured with one or more of the triggers described herein. For example, a WTRU may be configured with any of the triggers described herein or any combination of the triggers thereof. A WTRU may transition to the RRC_CONNECTED state or trigger an area update procedure for clearing/updating a context in an NW, for example, upon detecting that a PSCell or any or all cells of an SCG (e.g., configured and/or potential) is not suitable for access (e.g., based on measurements and/or a RRC configured SCG-ReleaseTimer expiration).

A WTRU may behave in one or more of the following ways before, during, and/or after a transition to the RRC_CONNECTED state or an area update.

A WTRU may transition to the RRC_CONNECTED state or may issue an area update based on a trigger, receiving a message, and/or the arrival of UL data. For example, a WTRU may transition the RRC_CONNECTED state or may issue an area update based on one or more of the following: receiving a paging message, the arrival of UL data at the WTRU, and/or one or more triggers. A WTRU may (e.g., as a result of a transition) provide information that may indicate a current mobility state of an SN node.

A WTRU may be configured to send information when the WTRU transitions to the RRC_CONNECTED state. For example, a WTRU may send one or more of the following during a transition to RRC_CONNECTED state: an indication to the NW to delete or alter an SN configuration or change a WTRU context to a single connectivity context; an indication to an NW whether a quality of a previously configured PSCell may be above a threshold; an indication of a cell/cells that may have a quality above a (e.g., specific) threshold; an indication of a best cell or a selected cell, for example, from a list of configured potential PSCells (e.g., based on determination mechanisms provided herein); and/or measurements of a set of cells (e.g., including a PSCell, potential PSCells, other detected cells on the same frequency as the PSCell). In an example, inclusion/report of measurements may be based on a triggering of (e.g., specific) events that may occur during mobility while in a WTRU is in a RRC_INACTIVE state (e.g., as described herein).

A WTRU may send the information described herein in one or more messages. For example, a WTRU may send the information described herein in the MSG3 of a RRC procedure and/or in a message following the RRC procedure. The WTRU may perform the RRC procedure for a state transition to the RRC_CONNECTED state or an area update. A WTRU may send an indication of the deletion of an SN configuration in MSG3. A WTRU may send a bitmap of cells (e.g., with reference to a previously configured list of cells) that may have a quality metric above a configured threshold. A WTRU may send a cell ID or other (e.g., similar) identification of a potential cell (e.g., the best potential PSCell). A WTRU may send a null ID, for example, when there is not a potential PSCells that measure above a threshold.

A WTRU may be configured to perform measurement event storage and/or reporting while the WTRU is in the RRC_INACTIVE state.

A WTRU may be configured to perform one or more measurements during a transition to the RRC_CONNECTED state or during an area update. The WTRU may perform the measurements based on the triggering of one or more SN-related events. For example, the SN-related events may be triggered during WTRU mobility while in the RRC_INACTIVE state. A WTRU may include one or more measurements in messaging that is sent to the NW, e.g., during a state transition or an area update for an event (e.g., each event) that is triggered.

A WTRU may be configured with (e.g., certain) events that may trigger a state transition or area update procedure (e.g., immediate state transitions or area update procedures). A WTRU may be configured with one or more events that may trigger inclusion/addition of one or more associated measurements that may be associated with an event in a report (e.g., a final measurement report). A repot may be transmitted, for example, when a state transition trigger occurs. Events may result in the addition of one or more measurements on a measurement report without a state transition. A WTRU may (e.g., for such events) cancel or remove previously added measurements, for example, upon a triggering of another event (e.g., when the WTRU leaves and re-enters an area that may be defined by potential PSCells).

A WTRU may convert its RRC context based on SN inactivity.

A WTRU may be configured with an inactivity timer that may be associated with data transmissions to an SN. A (e.g., all) RRC context that is associated with an SN may be updated and/or may be deleted, for example, upon expiration of a timer. A timer (e.g., inactivity timer) may be reset, for example, when a WTRU transmits and/or receives data on a (e.g., any) DRB and/or SRB associated with (e.g., associated only with) an SN (e.g., an SCG DRB). Resetting a timer (e.g., the inactivity timer) for a split DRB (e.g., a DRB where data is transmitted to an MN or SN) may be, for example, conditioned on rules which may be the same as the rules used for determining an UL path for the transmission of data. The rules for resetting a timer (e.g., the inactivity timer) may be, for example, the same as those for RRC_CONNECTED. The rules for resetting a timer (e.g., the inactivity timer) may be different, for example, when a WTRU is in the RRC_INACTIVE state. A WTRU may be configured to transmit data to an MN on a split bearer (e.g., certain split bearers) while in the RRC_INACTIVE state.

A WTRU may (e.g., upon expiration of a timer) convert the WTRU's DC context into a single connectivity context. A WTRU may perform, for example, one or more of the following: delete an SN configuration (e.g., including DC_I-nactive_SI); delete a connectivity context (e.g., any connectivity context) that is associated with an SN; stop performing measurements that are related to SN mobility; apply a single connectivity context. A connectivity context may be derived based on, for example, one or more predefined rules and/or a pre-configuration by a network (e.g., when a WTRU transitions to a RRC_INACTIVE state or when a WTRU is with DC).

A WTRU may transmit and/or receive data/control via an SN while in a RRC_INACTIVE state.

A WTRU in a RRC_INACTIVE state may transmit and/or receive data/RRC signaling from a PSCell while remaining in the RRC_INACTIVE state. A WTRU may remain in a RRC_INACTIVE state, for example, with limited operations performed with an MN and while being able to communicate with an SN. For example, when data/RRC signaling is associated with a DRB/SRB that is anchored and transmitted (e.g., only) on an SN leg, a WTRU may remain in a RRC_INACTVIE state (e.g., which may be advantageous).

A WTRU may receive a paging message via a cell (e.g., a MN), for example, to trigger DL data reception from another cell (e.g., a SN).

A WTRU may receive a paging message from a MN, for example, to initiate DL data reception at an SN. The paging message may be received by the WTRU while the WTRU is in a RRC_INNACTIVE state. The WTRU may receive the DL data from the SN (e.g., based on receiving the paging message form the MN) while the WTRU remains in the RRC_INACTIVE state. A paging message may include information that indicates, for example, one or more of the following: a WTRU ID; a cell ID of a PSCell (e.g., to receive the DL data); beam information (e.g., beam ID(s)) of a PSCell (e.g., to receive the DL data); an indication that a WTRU may receive DL data from an SN while remaining in RRC_INACTIVE; a C-RNTI (e.g., to be used by the WTRU for DL data reception); time offset(s) (e.g., to a required access or DL data reception on a PSCell following paging transmission); and/or time duration (e.g., of a data transmission or control channel monitoring via a PSCell). The time duration may be measured, for example, as one or more of the following: an absolute period of time, a number of frames/subframe/slots/minislots, a number of PDUs (e.g., at any given layer) to be transmitted, etc. The paging message may include the uplink timing difference to the PSCell/SCell. The WTRU may use the uplink timing difference to the PSCell/SCell for UL transmissions (e.g., when sending UL data via the SN). The paging message may include an uplink grant in the indicated PSCell/SCell that the WTRU may use for UL transmission to the SN. The paging message may include contention-free random access parameters to be used in the PSCell/SCell (e.g., SN cell) during the random access procedure for the SN cell (e.g., indicated by the network or chosen by the WTRU). Such parameters may be common to the cells (e.g., all the cells) in the configured SCG list, or a list of such parameters corresponding to individual cell(s) in the SCG list may be sent.

A WTRU may receive a paging message from a cell and perform one or more action to enable data and/or control information on another cell. For example, upon successfully receiving a paging message, a WTRU may perform one or more of the following: initiate a RACH procedure or RACH-like procedure to one or more PSCells, for example, to obtain uplink timing alignment and/or beam information for transmission/reception to the PSCell, and/or to inform the NW of a PSCell on which to transmit the DL data; start monitoring a control channel (e.g., using a C-RNTI that may be provided in a paging message or in a RACH procedure to an SN, while remaining in a RRC_INACTIVE state); and/or initiate a resume procedure (e.g., which may include a transition to a RRC_CONNECTED state) with the MN. One or more of the following may apply. The WTRU may initiate a resume procedure with a MN when the SN cell indicated in the paging message is not the best measured cell in the SCG list, or the SN has a quality below a certain threshold.

The WTRU may initiate a resume procedure with a MN when the WTRU cannot measure any cells above a threshold (e.g., a quality threshold and/or a measurement result threshold) in the SCG list. The WTRU may initiate a resume procedure with a MN when an initial RACH procedure or RACH-like procedure to an SN cell fails. The WTRU may initiate a resume procedure with a MN when the WTRU does not receive a DL message that includes a C-RNTI on any of the DL SN cells for a specified or configured period of time. The WTRU may initiate a resume procedure with a MN when the WTRU receives UL data (e.g., UL data larger than a certain amount or size, and/or having specific delay or reliability characteristics) while the WTRU is monitoring a DL control channel of the SN cell.

A WTRU may assume, receive, and/or determine a configured, pre-configured, and/or defined time offset. For example, the time offset may be time between when a WTRU receives a paging message on a PCell, and when the WTRU performs a RACH transmission to a PSCell and/or when the WTRU monitors a PSCell control channel.

A WTRU may simultaneously perform the actions described herein to one or more potential PSCells. A WTRU may monitor a control channel on one or more (e.g., all) PSCells in a list (e.g., an SCG list) that may be configured by a network. A WTRU may inform a network of which PSCell to transmit further DL data on. A WTRU may inform a network of which PSCell to transmit further DL data on, for example, following data reception (e.g., only during transmission of a first acknowledgement).

A WTRU may receive a paging message that indicates that the WTRU is to receive DL data from a SN. The WTRU may select a specific cell to use (e.g., select a cell to use from a list of cells) and may indicate the selected cell to the NW. The selected cell(s) may be indicated to the network by initiating a RACH procedure to (e.g., directly to) the cell selected by the WTRU. The WTRU may receive a C-RNTI from the RACH procedure and may monitor the PDCCH using the obtained C-RNTI.

A WTRU may receive a paging message that indicates that the WTRU is to receive DL data from the SN. For example, the paging message may indicate the DL cell on which the WTRU is to receive the data, and/or a C-RNTI and timing offset to be used by the WTRU in the target cell. The WTRU may perform (e.g., directly perform) a RACH to the cell selected by the NW, and/or monitor the PDCCH using the C-RNTI (e.g., C-RNTI provided in the paging message).

A WTRU may transmit data/control to an SN while in a RRC_INACTIVE state.

A WTRU may initiate data transmission, for example, to a last configured PSCell or to a potential PSCell, e.g., upon the arrival of UL data at the WTRU. A WTRU may initiate a data transmission to a PSCell, for example, when data arrives for an SCG bearer. A WTRU may initiate a data transmission to a PSCell, for example, when data arrives for a split bearer that may be anchored in an SN (e.g., when rules configured for transmission to a split bearer require transmission of a packet to the SN). A WTRU may decide to initiate a data transmission (e.g., as opposed to resuming in an SN) based on one or more of the following: when the amount of data to be transmitted on an SCG bearer or split bearer is less than a (e.g., configured) threshold; when data is not pending on (e.g., any) bearers that are non-SCG bearers; when data is associated with a certain priority (e.g., based on data QoS marking, or associated logical channel); and/or when a control (e.g., a RRC message) is associated with a message that may be (e.g., is normally) transmitted on SRB3.

A WTRU may be configured to transmit (e.g., directly to an SN via SRB3) one or more RRC messages that may be associated with SN mobility. A WTRU may perform an area update procedure (e.g., directly to an SN), for example, without a transition to the RRC_CONNECTED state.

A WTRU may perform a security procedure prior to the transmission of data and/or initiating a resume procedure to a SN.

A WTRU may perform data transmission and/or resume procedure with a SN. The WTRU may derive a key for encryption (e.g., a new key for encryption). The WTRU may use the key for the encryption of data/control messages sent to the SN (e.g., prior to such transmission). A WTRU may receive key derivation material for use with the SN. The key derivation material may include a National Communications Commission (NCC) parameter for use with the SN (e.g., SN-NCC) and/or a security key counter (e.g., a new SK-counter). The WTRU may receive the key derivation material during the resume procedure and/or when the WTRU transitions to a RRC_INNACTIVE state (e.g., is suspended to the RRC_INACTIVE state by the MN). The WTRU may receive the key derivation material directly from the SN. The WTRU may receive the SN key derivation material in a container. The container may include a transparent container, which may be received by the WTRU in a suspend message. The suspend message may be provided to the WTRU by a SN. For example, the suspend message may be provided by the SN to the MN (e.g., through inter-node messaging) and the MN ma provide the suspend message to the WTRU as a transparent container within a MN release message. A WTRU may assume that the SN key derivation material to be a function of the MN key derivation material.

As described herein, a WTRU may derive a key for the encryption of data/control sent to a SN based on a function. One or more of the following may be inputs and/or parameters to the key derivation function: a previous key; the cell ID of a PSCell to which the WTUR sends or has sent data or control; the stored WTRU ID; timing information (e.g., SFN, slot number, etc.); a newly derived MN key; and/or information obtained from an MN. As described herein, the WTRU may use a previous key to derive a key for the encryption of data/control sent to a SN. The WTRU may have used the previous key (e.g., a security context previously stored by the WTRU) for data/control sent to a previous SN and/or a previous MN. As described herein, the WTRU may use a newly derived MN key to derive a key for the encryption of data/control sent to a SN. For example, the WTRU may derive the new SN key as a function of the newly derived MN key. As described herein, the WTRU may use information obtained from an MN to derive a key for the encryption of data/control sent to a SN. For example, the WTRU may obtain the information following a RRC message exchange with the MN.

A WTRU may initiate an RRC procedure to the MN to enable derivation of the MN key and/or to obtain keying material for derivation of the SN key. The RRC procedure may be similar to a resume procedure. The RRC procedure may include a resume request message. The resume request message may include an indicator or flag, which may indicate the request to resume to the MN. The WTRU may receive a suspend-like message from the MN in response to the resume request. The message may provide the WTRU with the SN keying material. The message may include information that allows the WTRU to derive the new MN key, and/or keying material (e.g., NCC, sk-counter) applicable to the SN. The WTRU may derive the SN key as a function of the new MN key and/or the received keying material.

A WTRU may directly resume a connection with a SN. The WTRU may be configured in dual connectivity. While in a RRC_INACTIVE state, the WTRU may perform a resume procedure directly to the SN PSCell.

A WTRU may initiation a resume procedure with a SN based on one or more triggers. For example, the WTRU may perform a resume procedure with a SN based on or more of the following triggers.

A WTRU may perform a resume procedure with a SN based on a DRB on which UL data may become available at the WTRU. For example, the WTRU may be configured with an SCG DRB, or an SN terminated DRB. The WTRU may determine to perform a resume procedure to the SN when UL data becomes available for the DRB. The WTRU may perform a resume procedure to the MN (e.g., a PCell) when data arrives for other DRBs. A WTRU may perform a resume procedure to the SN when the WTRU is configured with a split DRB. A WTRU may perform a resume procedure to the SN when data that arrives at the WTRU is for a split DRB.

A WTRU may perform a resume procedure with a SN in response to a paging message. As described herein, the paging message may indicate that DL data is available for the WTRU on an SCG DRB or SN terminated DRB.

A WTRU may perform a resume procedure with a SN based on properties of data that becomes available for transmission. For example, a WTRU may receive data with different QoS requirements (e.g., eMBB vs URLLC), The WTRU may perform a resume directly to the SN directly if the WTRU supports QoS requirements.

A WTRU may perform a resume procedure with a SN based on a barred status on the MN. For example, a WTRU may be rejected during a resume procedure to the MN (e.g., due to NW congestion). In response to the rejected resume procedure to the MN, the WTRU may attempt a resume procedure to a SN.

A WTRU may perform a resume procedure with a SN based on measurements of the PCell/PSCell. A WTRU may perform a resume procedure directly to the SN when a DL cell quality of the SN is above a threshold. Also, or alternatively, a WTRU may perform a resume procedure directly to the SN when the SN quality measurements are better than the MN quality measurements. For example, measurements may be maintained by the WTRU while in a RRC_INACTIVE state.

A WTRU may perform a resume procedure with a SN based on the configuration of a bearer for which UL data has arrived for the WTRU. For example, a WTRU may initiate a resume procedure to the SN when the WTRU receives data for a bearer that can be routed via the SN (e.g., an SCG bearer or a split UL bearer. The WTRU may not initiate a resume procedure to the SN when the WTRU receives data for a bearer that cannot be routed via the SN.

A WTRU may perform a resume procedure with a SN based on keying material. The WTRU may be configured with keying material for the SN when the WTRU was last suspended. The WTRU may initiate a resume procedure to the SN if the WTRU was configured with keying material for the SN when the WTRU was last suspended.

A WTRU may reconfigure a bearer.

As described herein, a WTRU may perform a resume procedure with a SN. The WTRU may assume the roles of a MN and the SN are changed at initiation of the resume procedure and/or during the resume procedure. The WTRU may determine routing of DRBs/SRBs based on the change of roles. For example, a WTRU may route data from an MCG DRB to the previous SN (e.g., the new MN) following the change of roles. The WTRU may route data from an SCG DBR to the previous MN (e.g., the new SN). The WTRU's bearer reconfiguration may apply to SRBs (e.g., may only apply to SRBs). For example, the SN may take the role of the MN, and the WTRU may reconfigure the DRBs such that the DRBs' path is not changed. The WTRU may reconfigure and/or relocate SRBs. For example, the WTRU may reconfigure SRB1 (e.g., which may have been routed via the previous MN) to be routed to the new MN (e.g., the previous SN). The WTRU may reconfigure SRB1 starting from the resume to the new MN. The WTRU may reconfigure SRB3 to be routed to the old MN (e.g., the new SN).

A WTRU may change the MR-DC configuration. The WTRU may change the MR-DC configuration during a resume procedure to the SN. For example, a WTRU in NG-ENDC (e.g., a MCG in LTE and a SCG in NR) may reconfigure itself to use NE-DC (e.g., MCG in NR and SCG in LTE).

A WTRU may determine the lower layer configuration for a SCG. For example, a WTRU may release the lower layer (PHY, MAC, RLC) configurations of the SCG and may maintain the bearer/PDCP configuration when the WTRU transitions to the RRC_INACTIVE state. Reconfiguration of the lower layers (e.g., signaling overhead associated with transitions to a RRC_CONNECTED state) may not be performed (e.g., skipped). The lower layers of the WTRU may be reconfigured for a specific SCell (e.g., when the WTRU needs to access the Scell).

A WTRU may receive a predefined (e.g., dedicated) configuration for a SCG via signaling. A WTRU may be provided with one or more configurations (e.g., pre-defined dedicated configurations) that may be used in a given SCell (e.g., while the WTRU is in the RRC_INACTIVE state). Such pre-defined dedicated configuration may be associated with a lower-layer configuration, such as configurations of the PHY, MAC, or RLC layers. Such pre-defined dedicated configuration may be associated with a higher layer configuration, such as, PDCP and/or a radio bearer configuration. A configuration (e.g., each pre-defined configuration) may be associated with an index (e.g., that may be sent in the signaled configuration). The WTRU may receive such pre-defined dedicated configurations via RRC signaling while the WTRU is in a RRC_CONNECTED state, and/or as part of the RRC signaling to transition the WTRU to a RRC_INACTIVE state. Additionally, or alternatively, the WTRU may receive the pre-defined dedicated configurations via RRC signaling on a direct SRB (e.g., a SRB3 configured in the SN). When a WTRU is a RRC_INACTIVE state, the WTRU may receive an index of the dedicated configurations to apply for a given SCell, and/or the WTRU may apply the associated configuration for any operations to a respective SN SCell while the WTRU is in the RRC_INACTIVE state. The WTRU may apply the respective configuration to the SN Scell for, but not limited to, one or more of the following: data transmission while the WTRU remains in the RRC_INACTIVE state, a RACH procedure to SCell, measurements, and/or SI reception.

A WTRU may receive the dedicated configuration to apply for an SCell in SI, which may be broadcast by the SCell. The WTRU may monitor SI in the SCell and may receive an index that may indicate the dedicated configuration to be applied for that cell. The WTRU may receive the dedicated configuration to apply for an SCell in a list of index/SCell pairs transmitted in a PCell's SI (e.g., via broadcast and/or provided on-demand). The WTRU may be provided with a configuration (e.g., a single configuration) that the WTRU may apply to a set of SCells (e.g., all SCells in a SCell list).

A WTRU may use a default configuration for SCells. The WTRU may be provided with a default dedicated configuration to be used for one or more SCells (e.g., across all SCells). The default configuration may be preconfigured with specific value(s) in the WTRU or may be provided by RRC signaling or SI in the MN. The default configuration may be applied for (e.g., only for) specific operations while the WTRU is in s RRC_INACTIVE state (e.g., data transmission or RACH procedure to obtain timing alignment) and under (e.g., only under) certain conditions, such as, when the amount of data to be transmitted while in the RRC_INACTIVE state is lower than a threshold, and/or when the type of data to be transmitted has certain characteristics related to latency, reliability, and/or size of transmission. The WTRU may access (e.g., directly access) the SCell while in the RRC_INACTIVE state when the default configuration is applied. If a condition is not met, the WTRU may initiate a procedure to transition to a RRC_CONNECTED state.

The WTRU may obtain a dedicated configuration to resume access to a SCell. The WTRU may utilize a default configuration (e.g., a received default configuration, as described herein) to initiate a procedure to the SCell to obtain a (e.g., a non-default) dedicated configuration to be used in the SCell. The WTRU may perform a RACH procedure, exchange RRC message(s) with an SCell while in the RRC_INACTIVE state, and/or receive (e.g., as part of the signaling) the dedicated configuration to be used for further accesses to that SCell. The WTRU may perform subsequent accesses to the SCell (e.g., for data transmission) with the received non-default (e.g., dedicated) configuration.

The WTRU may invalidate the received non-default configuration as a result of one or more of the following: expiration of a timer, reception of a paging message instructing the WTRU to invalidate the received non-default configuration, reselection to a different cell associated with the MN, a measurement-related event whereby one or more SCells become better/worse than another of the one or more SCells, upon the WTRU's transition to the RRC_CONNECTED state, and/or the network indicates that the WTRU is to invalidate the received non-default configuration, such as, part of the signaling to transition to the RRC_CONNECTED state. The WTRU, upon reception of the dedicated (non-default) configuration, may receive a list of SCells that the configuration may be valid for (e.g., may also be valid for).

Figure 2:
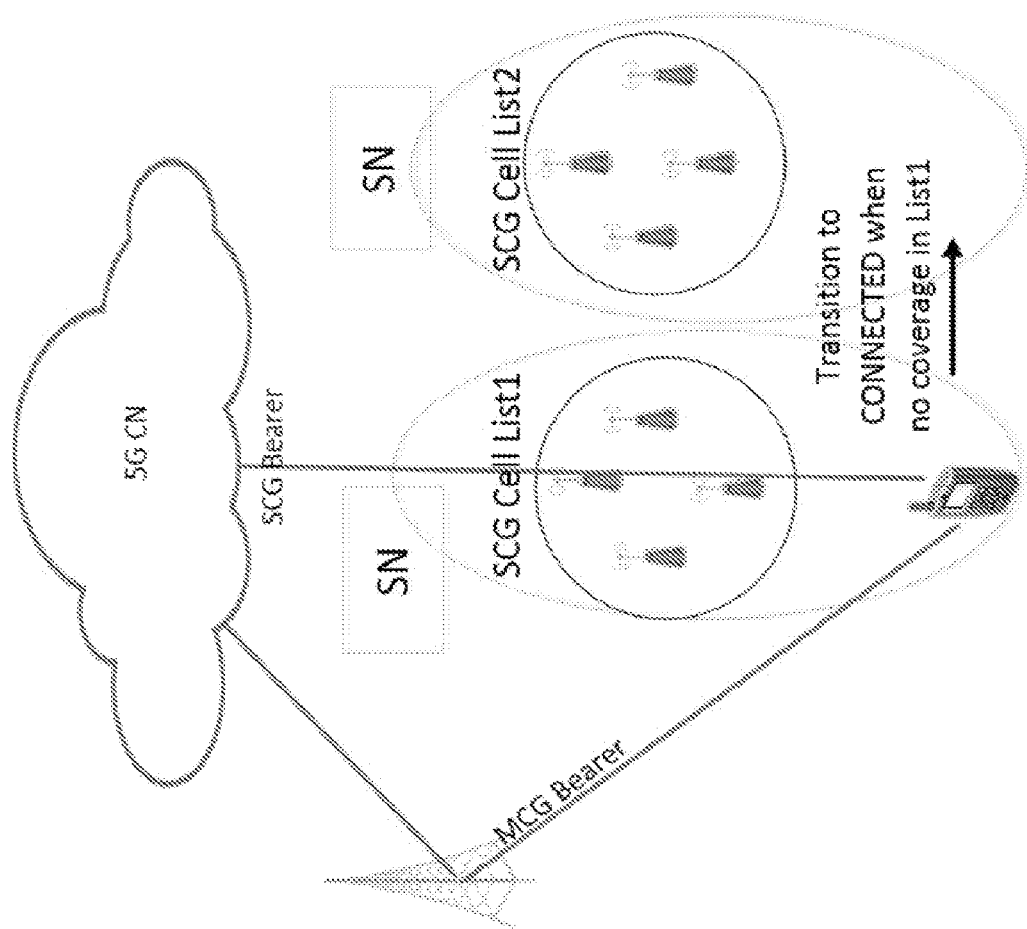
FIG. 2 shows an example of receiving DL data on a secondary cell group (SCG) cell while remaining in RRC_INACTIVE.
Figure 3:
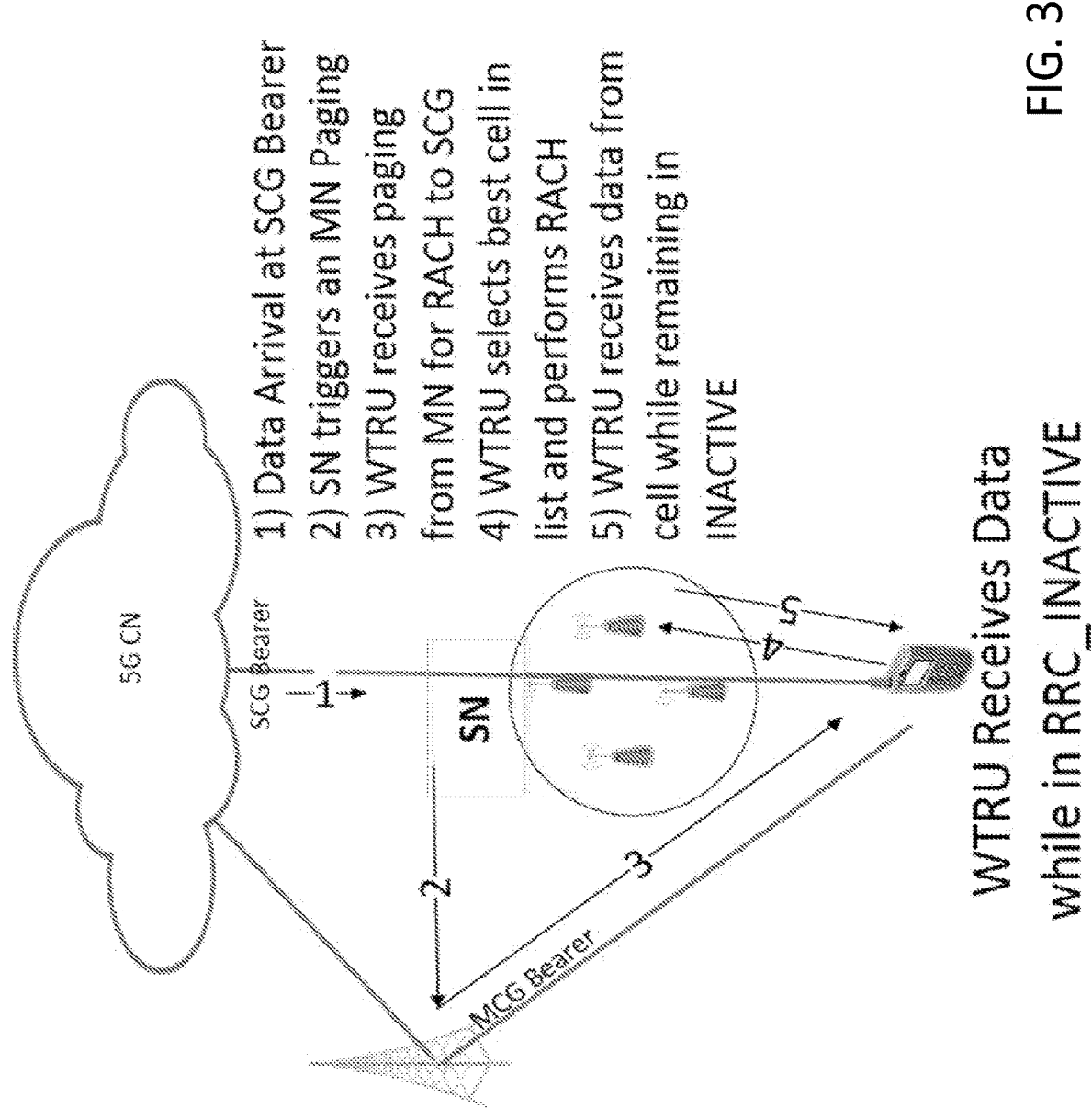
FIG. 3 shows an example of receiving DL data on an SCG cell while remaining in RRC_INACTIVE.

FIGS. 2 and 3 illustrate examples associated with a WTRU receiving DL data on an SCG cell while remaining in the RRC_INACTIVE state.

FIG. 2 illustrates an example associated with WTRU mobility. As illustrated in FIG. 2, a WTRU may communicate with a network (e.g., the 5G CN) via an MCG Bearer and/or a MN. The WTRU may be in communication with the network via an SCG Bearer. The SCG Bearer may be associated with an SN and/or one or more SCG cells (e.g., SCG Cell List1 and/or SCG Cell List2). As illustrated in FIG. 2, the WTRU may be configured with an SCG list (e.g., SCG Cell List1). The WTRU may be configured with the SCG list while in the RRC_CONNECTED state, or during a transition from the RRC_CONNECTED state to the RRC_INACTIVE state. The WTRU may be configured with the SCG list via the MCG Bearer and/or the MN. The WTRU may move around (e.g., perform mobility) while in the RRC_INACTIVE state as long as the WTRU remains in the coverage of the cells on the SCG list (e.g., a coverage condition). A coverage condition may be defined such that the WTRU has at least one of the cells on the SCG list being measured (e.g., using a quality metric) as above a threshold (e.g., a configured threshold). When the WTRU moves out of the coverage of the configured list as per the coverage condition (e.g., based on the quality metric for all cells on the SCG list being measured as below the threshold), the WTRU may initiate a transition to the RRC_CONNECTED state. When the WTRU transitions to the RRC_CONNECTED state, the WTRU may be configured with a new SCG list (e.g., SCG Cell List2, as illustrated in FIG. 2). After receiving the new SCG list, the WTRU may transition (e.g., immediately transition) to the RRC_INACTIVE state.

FIG. 3 illustrates an example associated with a WTRU receiving data from a cell while in a RRC_INACTIVE state. As illustrated in FIG. 3, a WTRU may communicate with a network (e.g., the 5G CN) via an MCG Bearer and/or a MN. The WTRU may be in communication with the network via an SCG Bearer. The SCG Bearer may be associated with an SN and/or one or more SCG cells. Also, or alternatively, the SN may be in communication with the MN. As illustrated in FIG. 3, data for the WTRU may arrive at the SCG Bearer and/or the SN. The SN may indicate the arrival of the data to the MN. The indicate of the data's arrival on the SCG may trigger the MN to transmit a paging message. For example, the paging message may be transmitted to the WTRU via the MCG and/or may indicate that data is available for the WTRU on the SCG bearer. The paging message may indicate that the WTRU is to perform RACH on another cell (e.g., a cell on a SCG list). As illustrated in FIG>3, the WTRU may, e.g., while in the RRC_INACTIVE state, receive the paging message. Upon reception of the paging message, the WTRU may select a cell from an SCG list (e.g., the currently configured SCG list). For example, the WTRU may determine and select the best cell in the SCG list. Upon such determination, the WTRU may perform a RACH procedure to the selected cell and receive data during the RACH procedure (e.g., a MSG4), and/or at another time following the RACH procedure (e.g., by decoding the PDCCH of the selected cell for a period of time).

Systems, methods, and instrumentalities have been disclosed for operating dual connectivity (DC) in an inactive state. System information (SI) may be provided for a DC configuration applicable to an INACTIVE state. A wireless transmit/receive unit (WTRU) may transition to RRC_CONNECTED or perform an area update procedure, for example, based on secondary node (SN)-mobility related triggers, e.g., for a list of potential primary secondary cells (PSCells) in an INACTIVE state DC configuration. Procedures may support measurement events related to a list of potential PSCells. A WTRU may report SN-related measurement information and an indication for context update/deletion, for example, during a state transition or area update. A WTRU may receive paging, which may initiate downlink (DL) data transmission (e.g., directly) from an SN. A WTRU may transmit control/data (e.g., an associated triggering conditions) while in RRC_INACTIVE (e.g., directly) to an SN.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit receive unit (WTRU) comprising:
a processor configured to:
receive a configuration information during a transition from a connected state to an inactive state, wherein the WTRU is configured to maintain an access stratum (AS) context while in the inactive state, and wherein the configuration information indicates a list of one or more cells on which to perform a respective measurement while the WTRU is associated with the inactive state;
perform a measurement on a cell from the list of one or more cells while the WTRU is associated with the inactive state; and
perform a resume procedure, wherein performing the resume procedure comprises a transition from the inactive state to the connected state and transmission of one or more measurement results based on measurements performed in accordance with the configuration information to a base station.

2. The WTRU of claim 1, wherein the wherein the cell corresponds to a cell that is supportable by the WTRU as a secondary cell if the WTRU transitioned to a connected state.

3. The WTRU of claim 1, wherein the cell corresponds to a cell that is supportable by the WTRU as a secondary cell group (SCG) cell.

4. The WTRU of claim 1, wherein the processor is further configured to:
determine to perform the measurement on the cell based on whether a duration of time has expired, wherein the processor is further configured to stop performing the measurement on the cell on a condition that the duration of time has expired, and wherein the processor is further configured to perform the measurement on the cell on a condition that the duration of time has not expired.

5. The WTRU of claim 1, wherein the configuration information comprises one or more of a carrier frequency information, a cell bandwidth information, a configuration information of reference signals (RSs), a measurement configuration information, an event configuration information, information associated with a primary cell (PCell), or information associated with a list of SCG cells to perform the measurement.

6. The WTRU of claim 1, wherein the configuration information comprises a system information (SI) message or a system information block (SIB) message.

7. The WTRU of claim 1, wherein the inactive state comprises an RRC_INACTIVE state, and the connected state comprises an RRC_CONNECTED state.

8. A method performed by a wireless transmit receive unit (WTRU), the method comprising:
receiving a configuration information during a transition from a connected state to an inactive state, wherein the WTRU is configured to maintain an access stratum (AS) context while in the inactive state, and wherein the configuration information indicates a list of one or more cells on which to perform a respective measurement while the WTRU is associated with the inactive state;
performing a measurement on a cell from the list of one or more cells while the WTRU is associated with the inactive state; and
performing a resume procedure, wherein performing the resume procedure comprises a transition from the inactive state to the connected state and transmitting one or more measurement results based on measurements performed in accordance with the configuration information to a base station.

9. The method of claim 8, wherein the cell corresponds to a cell that is supportable by the WTRU as a secondary cell if the WTRU transitioned to a connected state.

10. The method of claim 8, wherein the cell corresponds to a cell that is supportable by the WTRU as a secondary cell group (SCG) cell.

11. The method of claim 8, further comprising:
determining to perform the measurement on the cell based on whether a duration of time has expired, wherein the method further comprises stopping the performance of the measurement on the cell on a condition that the duration of time has expired, and wherein the method further comprises performing the measurement on the cell on a condition that the duration of time has not expired.

12. The method of claim 8, wherein the configuration information comprises one or more of a carrier frequency information, a cell bandwidth information, a configuration information of reference signals (RSs), a measurement configuration information, an event configuration information, information associated with a primary cell (PCell), or information associated with a list of SCG cells to perform the measurement.

13. The method of claim 8, wherein the configuration information comprises a system information (SI) message or a system information block (SIB) message.

14. The method of claim 8, wherein the inactive state comprises an RRC_INACTIVE state, and the connected state comprises an RRC_CONNECTED state.

15. A network node comprising a transceiver configured to:
transmit a first signal to a wireless transmit receive unit (WTRU), wherein the first signal is sent to the WTRU to transition the WTRU from a connected state to an inactive state, the first signal comprising a configuration information, wherein the configuration information indicates a list of cells on which the WTRU is to perform a respective measurement in the inactive state; and receive a second signal, the second signal comprising one or more measurement results, wherein the second signal is received during a transition of the WTRU from the inactive state to the connected state.

16. The network node of claim 15, wherein the configuration information comprises one or more of a carrier frequency information, a cell bandwidth information, a configuration information of reference signals (RSs), a measurement configuration information, an event configuration information, information associated with a primary cell (PCell), or information associated with a list of SCG cells to perform the measurement.

17. A method performed by a network node, the method comprising:

transmitting a first signal to a wireless transmit receive unit (WTRU), wherein the first signal is sent to the WTRU to transition the WTRU from a connected state to an inactive state, the first signal comprising a configuration information, wherein the configuration information indicates a list of cells on which the WTRU is to perform a respective measurement in the inactive state; and receiving a second signal, the second signal comprising one or more measurement results, wherein the second signal is received during a resume procedure of the WTRU for transitioning from the inactive state to the connected state.

18. The method of claim 17, wherein the configuration information comprises one or more of a carrier frequency information, a cell bandwidth information, a configuration information of reference signals (RSs), a measurement configuration information, an event configuration information, information associated with a primary cell (PCell), or information associated with a list of SCG cells to perform the measurement.

* * * * *